L. A. HAYDEN.
CRANBERRY HARVESTING MACHINE.
APPLICATION FILED FEB. 15, 1919.
1,371,306.
Patented Mar. 15, 1921.
3 SHEETS—SHEET 3.
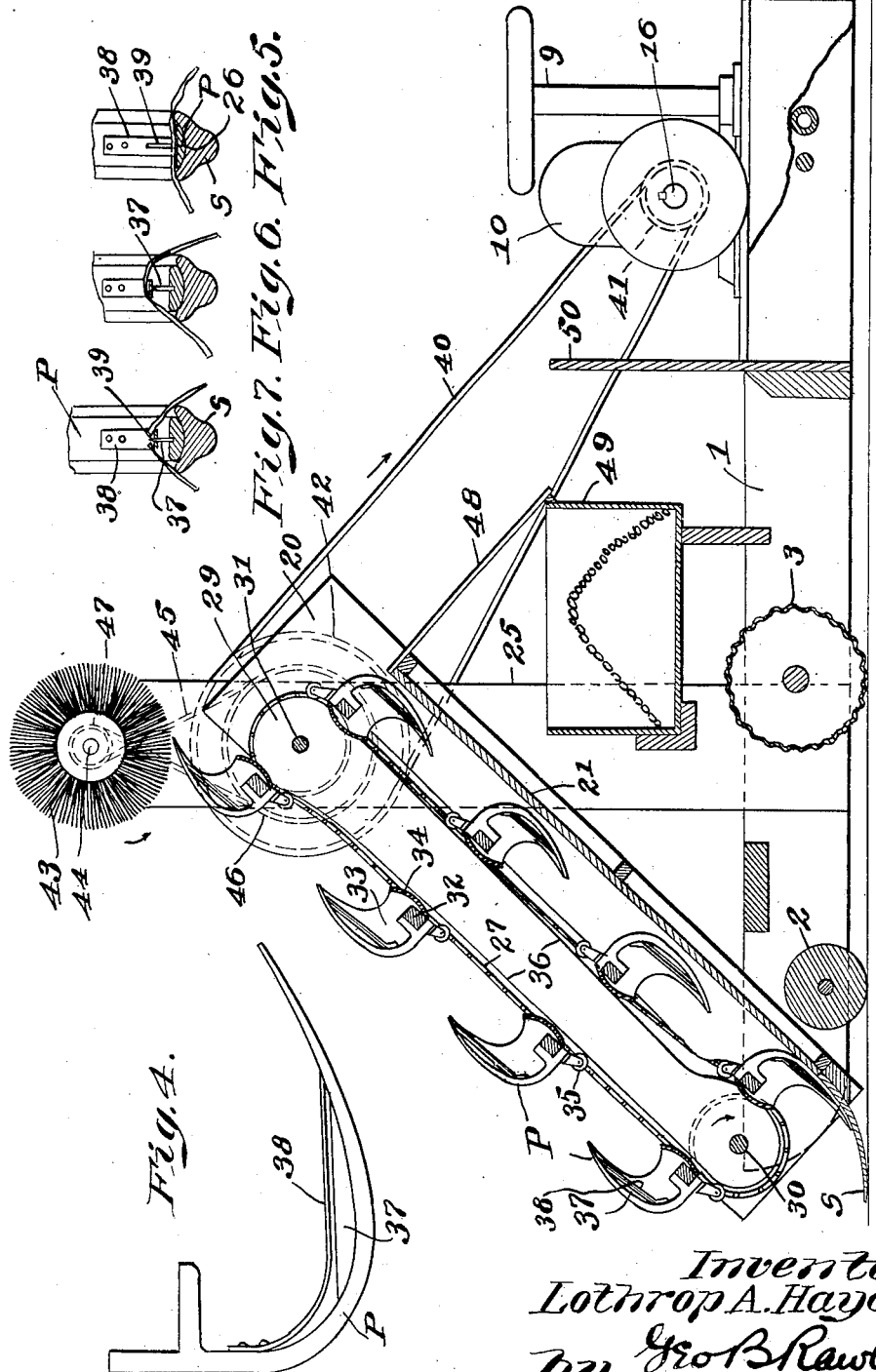
Inventor
Lothrop A. Hayden
by Geo B Rawlings
Attorney

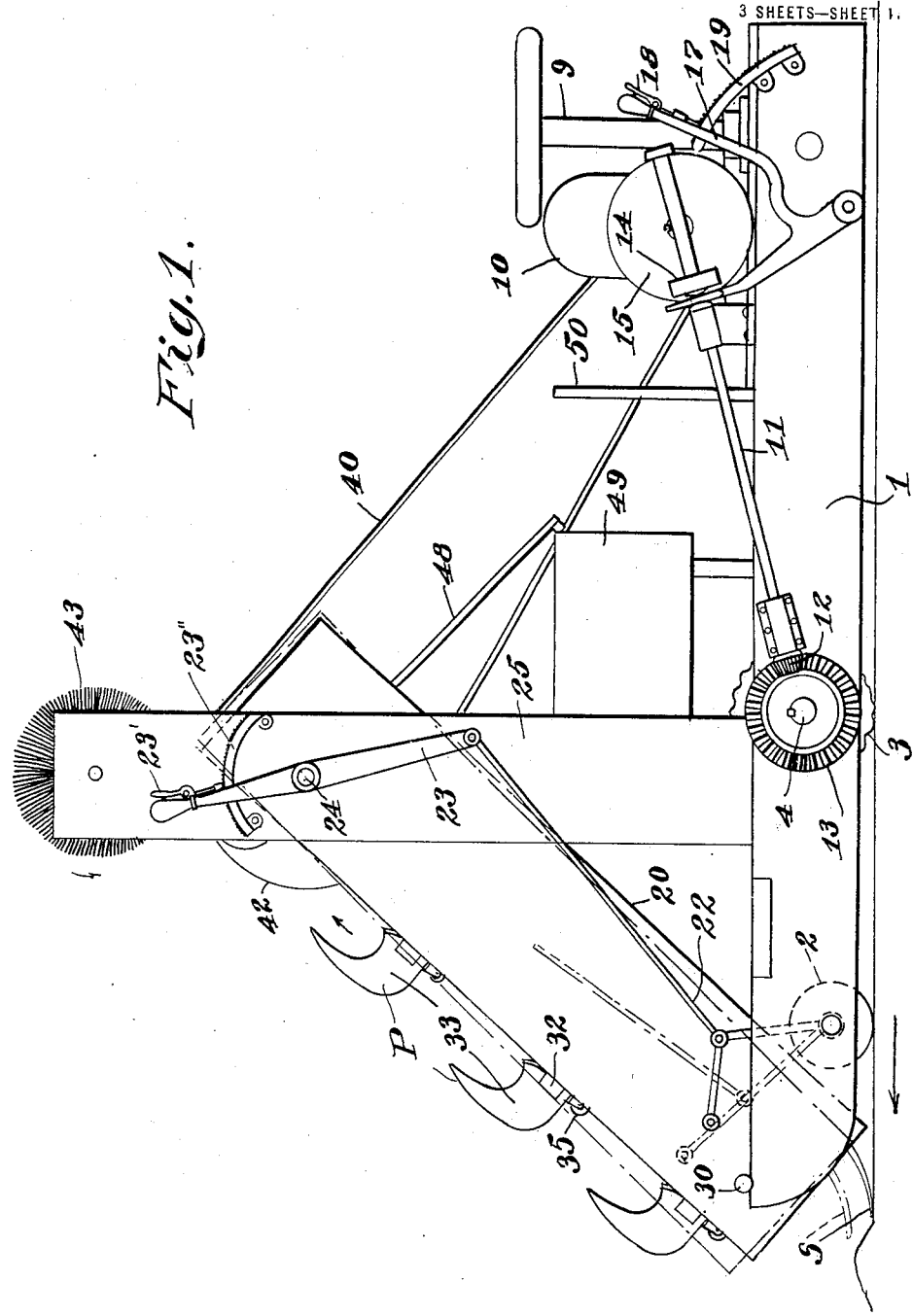

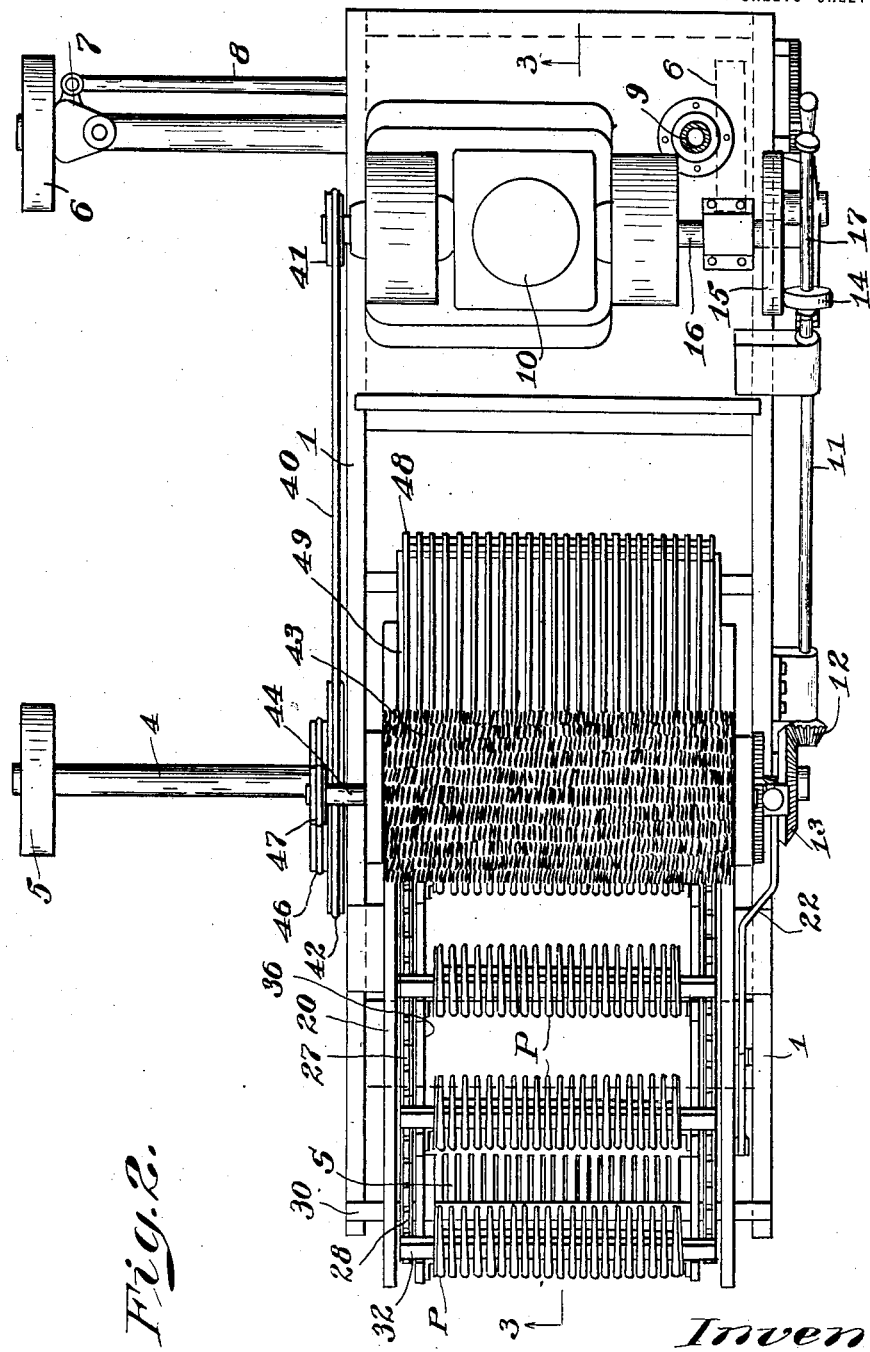

UNITED STATES PATENT OFFICE.

LOTHROP A. HAYDEN, OF WEST WAREHAM, MASSACHUSETTS, ASSIGNOR OF FIFTY-ONE PER CENT. TO NEW ENGLAND CRANBERRY SALES COMPANY, OF MIDDLEBORO, MASSACHUSETTS, A CORPORATION OF MASSACHUSETTS.

CRANBERRY-HARVESTING MACHINE.

1,371,306.     Specification of Letters Patent.     Patented Mar. 15, 1921.

Application filed February 15, 1919. Serial No. 277,195.

*To all whom it may concern:*

Be it known that I, LOTHROP A. HAYDEN, a citizen of the United States, residing at West Wareham, in the county of Plymouth and State of Massachusetts, have invented a new and useful Cranberry-Harvesting Machine, of which the following is a specification.

This invention relates to cranberry harvesting machines. The problem of a commercially successful machine of this class is complicated by the characteristic growth of the berry itself. Heretofore, so far as I am aware, such machines as have been devised have combed the vines to strip the berries therefrom. Usually, a toothed scoop is advanced under the vines to draw them between the teeth of the scoop and thereby strip off the berries. This frequently tears up the vines by the roots, especially where the growth is heavy and the vines thickly matted or entangled, and is therefore objectionable.

I avoid up-rooting the vines, while retaining the advantages of the stripping action, in a construction in which the vines are caused to automatically sever themselves after the scoop has raised them from the ground. According to my invention, the scoop enters under and slightly lifts the vines, whereupon gangs of rotating picker units are successively inserted between the scoop and the vines and, as the machine advances, sever the vines and strip the berries therefrom. In the embodiment herein selected as illustrative of the principles of my invention, the picker units are individually provided with vine cutters which automatically sever the vine as the picker travels over the scoop. In addition to their vine-severing function, the picker gangs strip the berries from the vine as the vine is drawn between the individual picker units, and convey the berries to a suitable collection receptacle. The vine cutters are normally covered so as not to injure the berries, and are automatically brought into vine-cutting relation at the proper moment by the vine itself. This is preferably accomplished by means of a slotted blade spring attached to each picker unit in normally covering relation to the cutter. The vine bears upon this spring and as the picker advances, flexes the spring, thereby exposing the cutter through the slot in the spring for action upon the vine. As the vine parts, the tension on the spring is removed, and the spring automatically returns to normal cutter-covering position.

In connection with the foregoing features, I provide simple and convenient mechanism for regulating the "dip" of the scoop and picker mechanism relative to the vines and for permitting said parts to be raised at will to clear obstructions. I have also provided for obtaining proper traction and ready control of the drive in my machine under all conditions of service. These, and various other features of advantage which will appear more fully hereinafter, are secured in the machine of the present invention.

The construction and operation of my invention, together with a preferred embodiment thereof, are described in the following specification, illustrated in the accompanying drawings, and particularly pointed out in the appended claims. Throughout the specification and drawings, like reference characters are correspondingly employed, and in the drawings:

Figure 1 is a side elevation, partly in section, of a cranberry harvesting machine in accordance with my invention.

Fig. 2 is a part plan view thereof.

Fig. 3 is a longitudinal section on the line 3—3 of Fig. 2.

Fig. 4 is a detail view of a picker unit, and

Figs. 5, 6 and 7 successively illustrate the combinative action of the scoop and a picker unit in severing and stripping the vine.

I have indicated at 1 a wheeled frame adapted to be propelled through the cranberry bog in the direction of the arrow, Fig. 1. As here shown, the machine is designed for self-propulsion, although it obviously may be otherwise propelled.

The frame 1 includes connected side members, a ground roller 2 journaled transversely of said members near the forward end of the machine, a corrugated or otherwise roughened traction roller 3 mounted on a shaft or axle 4 journaled substantially centrally of the frame, an idly-running ground wheel 5 preferably also mounted on said shaft 4, and a pair of steering wheels, one of which is indicated at 6 mounted near the rear end of the machine and provided with steering knuckles 7 and a connecting rod 8 whereby the machine may be steered from a steering column 9. The motor 10 for propelling the machine is preferably mounted near the rear end thereof upon a suitable platform, and through appropriate connections, as the shaft 11, pinion 12 thereon, and bevel gear 13 on traction shaft 4, drives the machine. The drive may be varied, if desired, through any suitable mechanism for this purpose, as the friction disk 14 on shaft 11 and coöperating disk 15 on the motor shaft 16. Disk 14 is adapted to be shifted relative to disk 15 by shift lever 17, the relation being held by the usual pawl 18 on said lever and toothed segment 19.

Near the forward end of the machine is mounted an upwardly and rearwardly inclined housing for a rotatable series of gangs of picker units P, which are preferably arranged as an endless conveyer, and coöperate with a relatively fixed scoop S mounted at the lower end of the housing to sever and strip the vines. The housing comprises side members 20 and a bottom member 21, and is preferably mounted to swing about the axle of the ground roller 2 as an axis. This may be accomplished through a system of toggle links 22 (Fig. 1) connected to said axle and to the housing and operated by a shift lever 23, which is pivoted at 24 to one of a pair of spaced uprights 25 rising from the frame of the machine in rear of said roller 2. The purpose of this construction is to permit the "dip" of the picker flight and scoop S into the vines to be varied as desired, and to permit the said parts to be raised at will to clear any obstruction in the bog. See dotted line showing of Fig. 1. The adjustment may be held by any suitable pawl 23' on lever 23 and toothed segment 23".

The scoop S consists of a suitably curved series of tines or teeth disposed transversely of the machine and relatively fixed as to the pickers. As the scoop enters beneath the vines, they are drawn upwardly between the scoop teeth and raised sufficiently to permit the picker units to enter between the scoop and vines. Preferably, the upper faces of the scoop teeth are channeled, as shown in Figs. 5, 6 and 7, to guide the picker units in their travel over the scoop.

Each picker gang P consists of a suitably curved series of picker units in the form of spaced teeth or fingers of progressively increasing thickness in cross-section from their tips back toward their shanks, and extending across the forward end of the machine coextensive with the scoop. The picker gangs are carried by chains 27 which pass over sprockets 28 and 29 mounted on shafts 30 and 31 journaled near the upper and lower ends of the housing 20. The chains 27 are caused to travel together by the transversely extending tie rods 32, and each picker gang has end-forming members 33 and a bottom-forming member 34, connecting said end-forming members and constituting therewith a bucket adapted to convey the berries along the upper stretch of the conveyer flight. The end picker units of each gang carry cam rolls 35 which travel in cam tracks or grooves 36 formed in the side walls of the housing 20 (Fig. 3), and which cause the gangs in the lower stretch of the conveyer flight to dip as they successively approach the scoop S so as to effectively coöperate therewith, and cause the gangs in the upper stretch of the conveyer flight to automatically discharge their contents as they pass over the upper sprocket.

Each picker unit is individually provided with a vine cutter 37, which may conveniently be a longitudinally arranged knife edge disposed across the major curve of the picker unit, as shown in Fig. 4. Each cutter 37 is normally disposed below the plane of a blade spring 38 which is attached at its rear end to the shank of the picker finger and has a longitudinally extending slot 39 alined with the cutter and through which the cutter is exposed to the vine upon flexation of the spring by the vine. This cutter is normally covered by the spring, so as not to injure the berries, and is automatically exposed for action upon the vine by the vine itself, but only when the vine is in position to be cut. When the vine is cut, the spring automatically returns to normal unflexed position and again covers the cutting edge 37.

The picker mechanism may be rotated from the motor, as by the belt 40, pulley 41 on the motor shaft, and pulley 42 on the upper sprocket shaft 31, and if desired, a brush or equivalent device 43 may be arranged in effective relation to the picker flight to remove any vines or the like which may lodge on the picker fingers. As here shown, the brush 43 is revoluble, being mounted on a shaft 44 journaled transversely of the uprights 25 above sprocket shaft 31, and is adapted to be rotated in reverse direction to the rotation of the picker flight, as by means of the crossed belt 45, pulley 46 on sprocket shaft 31, and pulley 47 on brush shaft 44 to direct the stripped vines toward the rear of the machine.

The pickers discharge onto an inclined screen or grid 48 arranged over a collection receptacle 49 mounted on the machine and preferably consisting of a series of straight wires or rods of sufficiently small diameter to prevent the berries from traveling therealong, and the berries accordingly fall through the interstices of the screen into the receptacle. If desired, a guard or baffle 50 may be arranged between the receptacle and the motor platform to protect the motor from the falling vines.

In operation, the motor propels the machine over the cranberry bog at the desired rate of speed. Proper traction is assured by the roller 3, and the machine is steered in the desired direction from the steering column 9. The toothed scoop S slightly raises the vines to permit the rotating pickers to successively insert themselves between the scoop and the vines, and by reason of their wedge-formation, to progressively tension the vines as the pickers move over the scoop. (Figs. 5, 6 and 7). The tension of the vines on the blade springs 38 depresses the springs to expose the vine-cutting edges 37 to the vines through the slots 39 in the springs, and the vines are severed. I have illustrated this action in its successive phases somewhat diagrammatically in Figs. 5, 6 and 7. Fig. 5 shows a picker tooth just beginning to insert itself between a scoop tooth and a vine supported upon the scoop tooth. At this phase of the action, the cutter is not exposed to the vine. As the picker tooth continues its advance over the scoop tooth, it raises the vine from the scoop tooth, due to the progressive wedge form of the picker tooth, and the vine is put under tension. See Fig. 6. When the cutter-covering spring 38 reaches and begins its forward and upward movement under the tensioned vine, the constantly increasing pressure of the vine on the spring depresses the spring, exposing the underlying cutter edge 37 to the vine through the slot 39 in spring 38, and the vine is severed. See Fig. 7. As soon as the vine is cut, the flexing pressure on the spring is removed, and the spring automatically returns to its normal cutter-covering position. As the pickers continue their travel over the scoop, the berries are stripped from the vines. The spacing of the picker fingers is such, however, that the berries cannot fall through, but are carried upwardly and rearwardly by the bucket-like picker gang, and are discharged onto the screen 48. The operation is so timed relatively that the scoop lifts a new lot of vines for harvesting as each picker gang moves into effective relation to the scoop.

The machine is efficient in operation and by reason of its combined vine-cutting and stripping action avoids up-rooting the vines.

Various modifications in the construction and arrangement of the parts of my invention as here described may obviously be made within the limits of the appended claims.

I claim:

1. In a cranberry harvester, a relatively stationary scoop having teeth adapted to elevate the vines, a berry stripper movable over the scoop teeth and under the elevated vines supported thereon, and means for moving the berry stripper forwardly and upwardly between the scoop teeth and the elevated vines to strip the berries from the vines.

2. In a cranberry harvester, a relatively stationary scoop having teeth adapted to elevate the vines, a cutter movable over the scoop teeth and under the elevated vines supported on said teeth, and means for moving said cutter forwardly and upwardly between the scoop teeth and the elevated vines to automatically sever said vines.

3. In apparatus of the class described, a traveling frame, relatively stationary vine elevating and supporting means mounted thereon, a toothed picker mounted on said frame for forward and upward movement between said elevating means and the vines supported thereon to strip the berries from the vines, and vine cutters mounted between the picker teeth and the elevating means and operating upon the vines during the passage of the picker teeth under the vines.

4. In a cranberry harvester, means to elevate and support the vines, vine cutters movable under the vines supported on said elevating means and normally disposed in non-cutting relation to the vines, and vine-operated guards for said cutters adapted upon operation to automatically expose the cutters for action upon the vines.

5. In a cranberry harvester, means to elevate the vines, berry stripping means movable over said elevating means to strip the berries from the elevated vines, and vine cutters mounted on said stripping means to move therewith and normally disposed in non-cutting relation to the vines.

6. In a cranberry harvester, means to elevate the vines, berry stripping means movable over said elevating means to strip the berries from the elevated vines, vine cutters movable under the elevated vines, and guards for said cutters operated by the vines themselves to expose the cutters to the vines.

7. In cranberry harvesting apparatus, means to elevate the vines, vine cutters movable relative to the vines, and slotted springs normally covering said cutters and flexed by the vines to expose the cutters through the slots in said springs for action upon the vines.

8. In apparatus of the class described, a vine elevating scoop, a toothed picker movable between said scoop and the vines supported thereon, and vine cutters mounted on said picker teeth in normal non-cutting relation to the vines and automatically exposed for action upon the vines by the movement of the picker over the scoop and under the vines supported thereon.

9. In apparatus of the class described, a toothed scoop to elevate the vines, a toothed picker movable longitudinally over the scoop between the scoop teeth and the vines supported thereon, vine cutters mounted on the picker teeth and normally disposed in non-cutting relation to the vines, and vine-operated guards for said cutters.

10. In cranberry harvesting apparatus, a traveling frame, a vine elevating scoop mounted thereon, a picker movable relative to said scoop, vine cutters mounted on the picker in normal non-cutting relation to the vines, and flexible guards for the cutters.

11. In cranberry harvesting apparatus, a scoop having a transverse series of spaced teeth adapted to elevate the vines, and a berry stripping picker movable longitudinally over the scoop teeth between said teeth and the elevated vines supported thereon to strip the berries from the vines and having a series of teeth coextensive with the scoop teeth and of progressively increasing thickness from their tips toward their rear ends.

12. In cranberry harvesting apparatus, a scoop having a transverse series of spaced curved teeth adapted to elevate the vines, and a berry stripping picker movable longitudinally between the scoop teeth and the elevated vines supported thereon to strip the berries from the vines and having a series of teeth coextensive with the scoop teeth and corresponding in curvature thereto and of progressively increasing thickness from their tips toward their rear ends.

13. In cranberry harvesting apparatus, a movable picker having curved teeth, and cutters mounted longitudinally of said picker teeth in the major curve thereof.

14. In cranberry harvesting apparatus, a movable picker having teeth, normally ineffective cutters mounted longitudinally of said teeth, and guards for said cutters automatically operable during a portion of the movement of the picker to expose said cutters.

15. In a cranberry harvester, means initially movable into the vines to elevate the same, means subsequently movable forwardly over said elevating means to strip the berries from the elevated vines, vine cutters carried by said stripping means and normally ineffective to cut the vines, and guards for said cutters operable in the movement of the stripping means over the elevating means to expose the cutters for action upon the vines.

16. In cranberry harvesting apparatus, a relatively stationary scoop having a transverse series of spaced teeth provided with grooves in their upper faces, and a picker having a series of spaced teeth coextensive with said scoop teeth and movable past said scoop with its teeth guided in said grooves.

17. In cranberry harvesting apparatus, a traveling frame, a vine elevating scoop mounted thereon, and a cutter flight comprising connected gangs of vine cutters mounted on said frame for successive orbital movement over said scoop and between it and the vines supported thereon.

18. In cranberry harvesting apparatus, a traveling frame, a vine elevating scoop mounted thereon, a picker flight comprising connected gangs of pickers mounted on said frame for successive orbital movement over said scoop and under the vines supported thereon, and longitudinally disposed vine-cutters carried by said pickers.

19. In cranberry harvesting apparatus, a traveling frame, a vine elevating scoop mounted thereon, a rotatable series of connected gangs of toothed picker units mounted on said frame for successive orbital movement past said scoop, and a cam track and connections adapted to cause said picker gangs to successively move into effective relation to said scoop during a portion of their travel.

20. In cranberry harvesting apparatus, a traveling frame, a scoop mounted thereon, and a picker flight comprising connected gangs of spaced picker teeth, and a bottom-forming member and end-forming members for each gang constituting a bucket conveyer mounted on said frame for successive orbital movement past said scoop.

21. In a cranberry harvester, means initially movable into the vines to elevate the same, means subsequently movable over said elevating means to strip the berries from the elevated vines, and vine cutters effective only during the stripping operation to cut the vines while elevated by said elevating means.

22. In apparatus of the class described, a traveling frame including a pivoted housing, a picker and a scoop mounted on said housing for relative operating movement, and an adjusting lever and a toggle connection for swinging said housing relative to said frame to simultaneously vary the adjustment of the scoop and picker.

23. In a cranberry harvester, means to elevate the vines, means to strip the vines, vine cutters movable over said elevating means, and guards normally covering said cutters and automatically operable during a portion of the movement of the cutters to expose said cutters for action upon the vines.

24. In a cranberry gatherer, the combination with a vine-lifting scoop, of a berry-stripping picker comprising an endless flight having a plurality of spaced picker units, and means for moving said flight past said scoop.

25. In a cranberry gatherer, the combination with a vine-lifting scoop, of a berry-stripping picker comprising an endless flight having a plurality of spaced gangs of picker teeth, and means for moving said flight longitudinally over said scoop.

Signed at West Wareham, in the county of Plymouth, and State of Massachusetts, this 1st day of February, 1919.

LOTHROP A. HAYDEN.

Witnesses:
CLINTON W. ALDEN,
JOHN C. MAKEPEACE.